(12) United States Patent
Benakli et al.

(10) Patent No.: US 7,324,304 B1
(45) Date of Patent: Jan. 29, 2008

(54) TAPERED WRITE POLE FOR REDUCED SKEW EFFECT

(75) Inventors: Mourad Benakli, Shrewbuy, MA (US); Michael Mallary, Sterling, MA (US); Adam F. Torabi, Shrewbury, MA (US)

(73) Assignee: Maxtor Corporation, Longmont, CO (US)

( * ) Notice: Subject to any disclaimer, the term of this patent is extended or adjusted under 35 U.S.C. 154(b) by 371 days.

(21) Appl. No.: 10/993,915

(22) Filed: Nov. 18, 2004

Related U.S. Application Data (60) Provisional application No. 60/523,556, filed on Nov. 20, 2003.

(51) Int. Cl.
*G11B 5/127* (2006.01)
*G11B 5/31* (2006.01)

(52) U.S. Cl. .................................... 360/126; 360/122

(58) Field of Classification Search ............... 360/313, 360/125, 126, 122
See application file for complete search history.

(56) References Cited

U.S. PATENT DOCUMENTS

| | | | |
|---|---|---|---|
| 4,649,449 A * | 3/1987 | Sawada et al. | 360/123 |
| RE33,949 E | 6/1992 | Mallary et al. | |
| 6,710,973 B2 * | 3/2004 | Okada et al. | 360/125 |
| 7,006,326 B2 * | 2/2006 | Okada et al. | 360/125 |
| 7,100,266 B2 * | 9/2006 | Plumer et al. | 29/603.14 |
| 7,133,252 B2 * | 11/2006 | Takano et al. | 360/125 |
| 2002/0034043 A1 * | 3/2002 | Okada et al. | 360/125 |
| 2004/0066574 A1 * | 4/2004 | Crue et al. | 360/125 |
| 2005/0237665 A1 * | 10/2005 | Guan et al. | 360/125 |
| 2006/0256471 A1 * | 11/2006 | Plumer et al. | 360/122 |

FOREIGN PATENT DOCUMENTS

| | | | |
|---|---|---|---|
| JP | 62279504 A | * | 12/1987 |
| JP | 62283401 A | * | 12/1987 |
| JP | 11250416 A | * | 9/1999 |
| JP | 2002133610 A | * | 5/2002 |

OTHER PUBLICATIONS

"Edge Effect Magnetic Recording," Dec. 1966, IBM Technical Disclosure Bulletin, vol. 9, Iss. 7, pp. 776-777.*
Brume M. Lairson et al., Disk Drive Integration Issues for Perpendicular Recording; IEEE Transactions on Magnetics, vol. 37, No. 4, Jul. 2001.
Authors: Mochizuki; Nishida; Kawato; Okada; Kawabe; Takano, Title: "Study on the Write-Field Profile and Intensity of Narrow-Track-Width SPT Head", Journal of Magnetism and Magnetic Materials 235, Date: 2001; pp. 191-195.

* cited by examiner

*Primary Examiner*—William J Klimowicz
(74) *Attorney, Agent, or Firm*—Foley & Lardner LLP (57) ABSTRACT

A write pole for a read/write head of a disk drive system has a tapered surface on a leading edge thereof. Preferably, the tapered surface has a taper angle of between 0 and 20 degrees from a plane normal to the ABS. By having a write pole with a taper in this manner, sufficient write fields can be achieved even with thinner write pole tips on the ABS surface. By decreasing the thickness of the write pole tip in this manner while maintaining sufficiently high write fields, the skew profile of a write head can be decreased and areal density increased.

16 Claims, 5 Drawing Sheets

TAPERED WRITE POLE FOR REDUCED SKEW EFFECT

CROSS-REFERENCE TO RELATED APPLICATIONS

This application claims priority from U.S. Provisional Patent Application No. 60/523,556, filed Nov. 20, 2003, entitled "Head Design for Reduced Skew Effect on Perpendicular Recording", the contents of which are incorporated herein by reference.

FIELD OF THE INVENTION

This application relates to techniques and arrangements for write heads in data storage applications, particularly geometries and processes for achieving geometries of write heads that reduce skew effects.

BACKGROUND OF THE INVENTION

In hard disk drives, data is written to and read from magnetic recording media, herein called disks. Typically, one or more disks having a thin film of magnetic material coated thereon are rotatably mounted on a spindle. A read/write head mounted on a pivotably-mounted actuator arm is positioned in close proximity to the disk surface to write data to and read data from the disk surface.

During operation of the disk drive, the actuator arm moves the read/write head to the desired radial position on the surface of the rotating disk where the read/write head electromagnetically writes data to the disk and senses magnetic field signal changes to read data from the disk. Usually, the read/write head is integrally mounted in a carrier or support referred to as a slider. The slider generally serves to mechanically support the read/write head and any electrical connections between the read/write head and the disk drive. The slider is aerodynamically shaped, which allows it to fly over and maintain a uniform distance from the surface of the rotating disk.

Typically, the read/write head includes a magnetoresistive read element to read recorded data from the disk and an inductive write element to write the data to the disk. The read element includes a thin layer of a magnetoresistive sensor stripe sandwiched between two magnetic shields that may be electrically connected together but are otherwise isolated. A current is passed through the sensor stripe, and the resistance of the magnetoresistive stripe varies in response to a previously recorded magnetic pattern on the disk. In this way, a corresponding varying voltage is detected across the sensor stripe. The magnetic shields help the sensor stripe to focus on a narrow region of the magnetic medium, hence improving the spatial resolution of the read head.

The write element typically includes a coil of wire through which current is passed to create a magnetic field that can be directed toward an adjacent portion of the disk by a ferromagnetic member known as a write pole. While it is known that the write element can be arranged to either store data longitudinally or perpendicularly on the disk, most, if not all, commercial disk drives to date have utilized longitudinal recording arrangements. Although perpendicular recording techniques have the potential to allow for higher densities of recorded information, longitudinal recording is used in all current products for historical reasons. An early perpendicular recording technique is disclosed in U.S. Pat. No. RE 33,949, the contents of which are incorporated herein by reference.

The '949 patent discloses a perpendicular or vertical write head with a write pole section, downstream shield section, and a pancake coil surrounding the write pole section to generate magnetic flux therein. The shield section is disclosed to have a surface facing toward the media that is many times larger than a similarly-oriented face of the write pole. The media is disclosed to include two layers, an upper layer closer to the head having perpendicular uniaxial anisotropy and a lower layer having low magnetic reluctance (now known as the Soft Under Layer (SUL)). A high write field can then be produced between the write pole and the SUL to record information in the upper layer of the media. The write flux returns through the SUL to the downstream write shield.

Due to the pivotable mounting of the actuator arm, the angular alignment of the read/write head to a particular data track on the adjacent storage disk can vary based on the radial position of the data track on a disk. In other words, the angular alignment at a data track near the inner diameter of the media surface on the disk will be different than the angular alignment near the outer diameter of the media surface on the disk. This phenomenon is known as skew or the skew angle, and the profile of such skew angles across the different radial portions of the disk is known as the skew profile. As can be appreciated, depending on design criteria, it is possible for the disk drive system to be designed so that the relative angular alignment is optimal at the outer diameter and the greatest amount of skew angle is achieved at the inner diameter. Conversely, the design could optimize the skew angle at the inner diameter and have the least optimal skew angle at the outer diameter, or the optimal angular alignment could be achieved somewhere in between the inner or outer diameter. In modern disk drive systems, the worst-case skew angle may typically be in a range of 15 to 20 degrees (e.g., 17 degrees).

It should be understood that a primary difference between longitudinal recording and perpendicular recording is that with longitudinal recording the magnetic field is primarily generated in the write gap between the write pole tip and the return pole tip, while in perpendicular recording the magnetic field is primarily generated in the region between the write pole tip and the soft underlayer in the magnetic media. Thus, with perpendicular recording, the field will be generated in a cross-sectional area that corresponds to the footprint of the write pole tip appearing at the ABS. It can then be appreciated that it is desirable for the footprint of a write pole tip to be minimized. It can also be appreciated that significant skew angles produce a footprint that is skewed relative to the data recording track and creates a portion in the track where some of the data recorded is via side writing from a side edge of the footprint, which is undesirable. In order to reduce this effect, write pole tips for perpendicular recording may typically be trapezoidal in shape rather than rectangular. The side bevel angle on the write pole tip (the extent to which the lateral side of the write pole tip deviates from a 90 degree angle with the leading or trailing edge) determines the amount of bevel of the trapezoidal head. Unfortunately, there are limits to the amount of side bevel in a trapezoidal head that is desirable. Typically, it is not desirable to have a bevel greater than 10 degrees because of the lost cross-sectional area that a bevel creates, which reduces write flux, write field, and eventually areal density.

It is desirable to design a write head which does not suffer from the above drawbacks. It is against this background and a desire to improve on the prior art that the present invention has been developed.

SUMMARY OF THE INVENTION

In view of the foregoing, a broad objective of the present invention is to provide a read/write head with reduced skew effect.

In carrying out these and other objectives, features, and advantages of the present invention, a read/write head for a disk drive is described, the head being suitable for recording data in adjacent magnetic recording media, the media including a first layer for recording data and a second layer that is a soft underlayer (SUL) to return magnetic flux to the read/write head. The head includes a read transducer and a write transducer that includes a write pole and a write coil. The write pole has a tapered surface on a side that is generally perpendicular to the direction of relative motion between the read/write head and the adjacent magnetic recording media, the magnitude of the taper being less than 20 degrees.

The magnitude of the taper may be less than 15 degrees. The magnitude of the taper may be more than 5 degrees. The magnitude of the taper may be between 7 and 13 degrees. The magnitude of the taper may be approximately 10 degrees.

The write transducer also may include a write shield. The tapered surface may be on an opposite side of the write pole from the write shield. The tapered surface may be on a side of the write pole facing the write shield. The tapered surface may be on a leading side or a trailing side of the write pole.

The write pole may have a thickness on an ABS side thereof that is less than 300 nanometers from a leading edge to a trailing edge thereof. The tapered surface may be generally planar. The tapered surface may include a series of cascading steps. The write pole may have an ABS and the distance from the ABS to a first step may be equal to or greater than the distance from the ABS to the SUL.

The invention may also relate to a method for producing a tapered write pole in a read/write head for a disk drive. The method includes providing a substrate; applying a photo resist mask to a portion of the substrate; depositing an insulative material to a portion of the substrate adjacent to the photo resist mask, at least a portion of the insulative material being formed in a ramp; removing the photo resist mask; applying a write pole tip layer on top of the substrate and insulative ramp; planarizing the write pole tip layer and insulative ramp to substantially create a plane; and lapping the entire structure from a direction generally parallel to the plane to create an ABS surface.

The insulative material may be aluminum oxide. The ramp shape to the insulative layer may be created by sweeping the angle of deposition in depositing the insulative layer. Ion beam deposition may be used. The slope of the ramped insulative layer relative to the substrate may be less than 20 degrees, less than 15 degrees, more than 5 degrees, between 7 and 13 degrees, or approximately 10 degrees.

The substrate may include a write yoke. The substrate may include other components of a write transducer. The substrate may include other components of a read transducer. The ramp may be generally planar. The ramp may include a series of cascading steps. The disk drive may include a magnetic storage disk adjacent to the head, the disk having an SUL, wherein the distance from the ABS to a first step may be equal to or greater than the distance from the ABS to the SUL.

The invention may also relate to a method for producing a tapered write pole in a read/write head for a disk drive. The method may include providing a substrate; depositing an insulative material to the substrate, at least a portion of the insulative material forming a ramp; applying a write pole tip layer to the structure so that the write pole tip has a tapered surface corresponding to the ramp; and lapping the entire structure to create an ABS surface.

Numerous additional features and advantages of the present invention will become apparent to those skilled in the art upon consideration of the further description that follows.

DETAILED DESCRIPTION OF THE PREFERRED EMBODIMENT

Reference will now be made to the accompanying drawings, which assist in illustrating the various pertinent features of the present invention. Although the present invention will now be described primarily in conjunction with disk drives, it should be expressly understood that the present invention may be applicable to other applications where magnetic recording of data is required/desired. In this regard, the following description of a disk drive is presented for purposes of illustration and description. Furthermore, the description is not intended to limit the invention to the form disclosed herein. Consequently, variations and modifications commensurate with the following teachings, and skill and knowledge of the relevant art, are within the scope of the present invention. The embodiments described herein are further intended to explain best modes known of practicing the invention and to enable others skilled in the art to utilize the invention in such, or other embodiments and with various modifications required by the particular application(s) or use(s) of the present invention.

Figure 7:
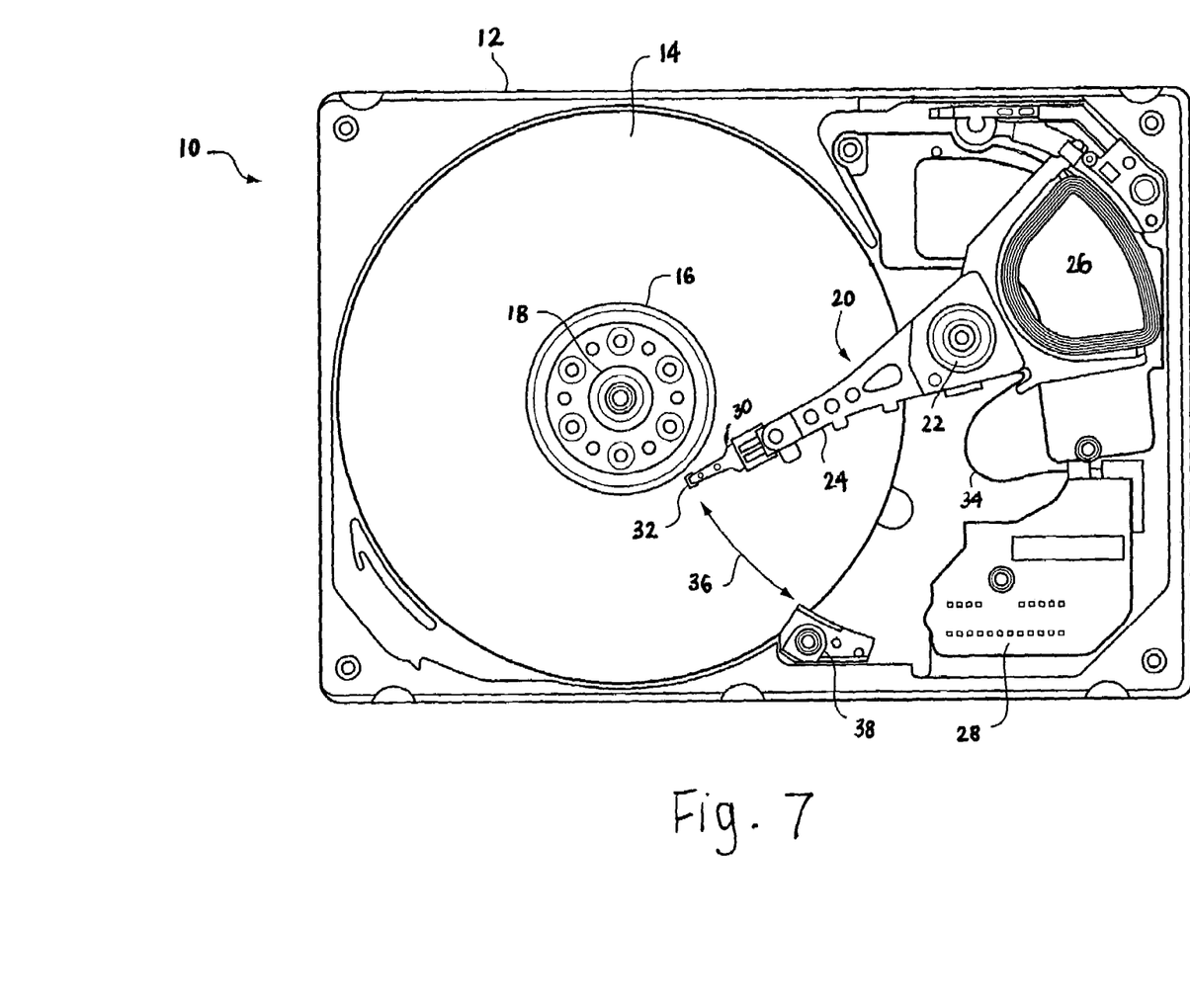
FIG. 7 is a top view of a disk drive system that utilizes a read/write head of the present invention.

FIG. 7 illustrates one embodiment of a disk drive 10. The disk drive 10 generally includes a base plate 12 and a cover (not shown) that may be disposed on the base plate 12 to define an enclosed housing or space for the various disk drive components. The disk drive 10 includes one or more data storage disks 14 of any appropriate computer-readable data storage media. Typically, both of the major surfaces of each data storage disk 14 include a plurality of concentrically disposed tracks for data storage purposes. Each disk 14 is mounted on a hub or spindle 16, which in turn is rotatably interconnected with the disk drive base plate 12 and/or cover. Multiple data storage disks 14 are typically mounted in vertically spaced and parallel relation on the spindle 16. Rotation of the disk(s) 14 is provided by a spindle motor 18 that is coupled to the spindle 16 to simultaneously spin the data storage disk(s) 14 at an appropriate rate.

The disk drive 10 also includes an actuator arm assembly 20 that pivots about a pivot bearing 22, which in turn is rotatably supported by the base plate 12 and/or cover. The actuator arm assembly 20 includes one or more individual rigid actuator arms 24 that extend out from near the pivot bearing 22. Multiple actuator arms 24 are typically disposed in vertically spaced relation, with one actuator arm 24 being provided for each major data storage surface of each data storage disk 14 of the disk drive 10. Other types of actuator arm assembly configurations could be utilized as well, such as an "E" block having one or more rigid actuator arm tips or the like that cantilever from a common structure. In any case, movement of the actuator arm assembly 20 is provided by an actuator arm drive assembly, such as a voice coil motor 26 or the like. The voice coil motor 26 is a magnetic assembly that controls the operation of the actuator arm assembly 20 under the direction of control electronics 28. Any appropriate actuator arm assembly drive type may be utilized by the disk drive 10, including a linear drive (for the case where the actuator arm assembly 20 is interconnected with the base plate 12 and/or cover for linear movement versus the illustrated pivoting movement about the pivot bearing 22) and other types of rotational drives.

A load beam or suspension 30 is attached to the free end of each actuator arm 24 and cantilevers therefrom. Typically, the suspension 30 is biased generally toward its corresponding disk 14 by a spring-like force. A slider 32 is disposed at or near the free end of each suspension 30. What is commonly referred to as the "head" (e.g., transducer) is appropriately mounted on the slider 32 and is used in disk drive read/write operations.

The head on the slider 32 may utilize various types of read sensor technologies such as anisotropic magnetoresistive (AMR), giant magnetoresistive (GMR), tunneling magnetoresistive (TuMR), other magnetoresistive technologies, or other suitable technologies. AMR is due to the anisotropic magnetoresistive effect with a normalized change in resistance ($\Delta R/R$) of 2-4%. GMR results from spin-dependent scattering mechanisms between two (or more) magnetic layers. The typical use in recording heads is the spin valve device that uses a pinned magnetic layer and a free layer to detect external fields. The normalized change in resistance is typically 8-12%, but can be as large as 15-20% when used with specular capping layers and spin-filter layers. TuMR is similar to GMR, but is due to spin dependent tunneling currents across an isolation layer. The typical embodiment includes a free layer and a pinned layer separated by a insulating layer of $Al_2O_3$ with the current flowing perpendicular to the film plane, producing normalized change in resistance of 12-25%. The term magnetoresistive is used in this application to refer to all these types of magnetoresistive sensors and any others in which a variation in resistance of the sensor due to the application of an external magnetic field is detected. The write transducer technology of the head of the present invention is discussed in further detail below.

The biasing forces exerted by the suspension 30 on its corresponding slider 32 thereby attempt to move the slider 32 in the direction of its corresponding disk 14. Typically, this biasing force is such that if the slider 32 were positioned over its corresponding disk 14, without the disk 14 being rotated at a sufficient velocity, the slider 32 would be in contact with the disk 14.

The head on the slider 32 is interconnected with the control electronics 28 of the disk drive 10 by a flex cable 34 that is typically mounted on the actuator arm assembly 20. Signals are exchanged between the head and its corresponding data storage disk 14 for disk drive read/write operations. In this regard, the voice coil motor 26 is utilized to pivot the actuator arm assembly 20 to simultaneously move the slider 32 along a path 36 and "across" the corresponding data storage disk 14 to position the head at the desired/required radial position on the disk 14 (i.e., at the approximate location of the correct track on the data storage disk 14) for disk drive read/write operations.

When the disk drive 10 is not in operation, the actuator arm assembly 20 is pivoted to a "parked position" to dispose each slider 32 generally at or beyond a perimeter of its corresponding data storage disk 14, but in any case in vertically spaced relation to its corresponding disk 14. This is commonly referred to in the art as being a dynamic load/unload disk drive configuration. In this regard, the disk drive 10 includes a ramp assembly 38 that is disposed beyond a perimeter of the data storage disk 14 to typically both move the corresponding slider 32 vertically away from its corresponding data storage disk 14 and to also exert somewhat of a retaining force on the actuator arm assembly 20. Any configuration for the ramp assembly 38 that provides the desired "parking" function may be utilized. The disk drive 10 could also be configured to be of the contact start/stop type, where the actuator arm assembly 20 would pivot in a direction to dispose the slider(s) 32 typically toward an inner, non-data storage region of the corresponding data storage disk 14. Terminating the rotation of the data storage disk(s) 14 in this type of disk drive configuration would then result in the slider(s) 32 actually establishing contact with or "landing" on its corresponding data storage disk 14, and the slider 32 would remain on the disk 14 until disk drive operations are re-initiated.

The slider 32 of the disk drive 10 may be configured to "fly" on an air bearing during rotation of its corresponding data storage disk(s) 14 at a sufficient velocity. The slider 32 may be disposed at a pitch angle such that its leading edge is disposed further from its corresponding data storage disk 14 than its trailing edge. The head would typically be incorporated on the slider 32 generally toward its trailing edge since this is positioned closest to its corresponding disk 14. Other pitch angles/orientations could also be utilized for flying the slider 32.

Figure 1:
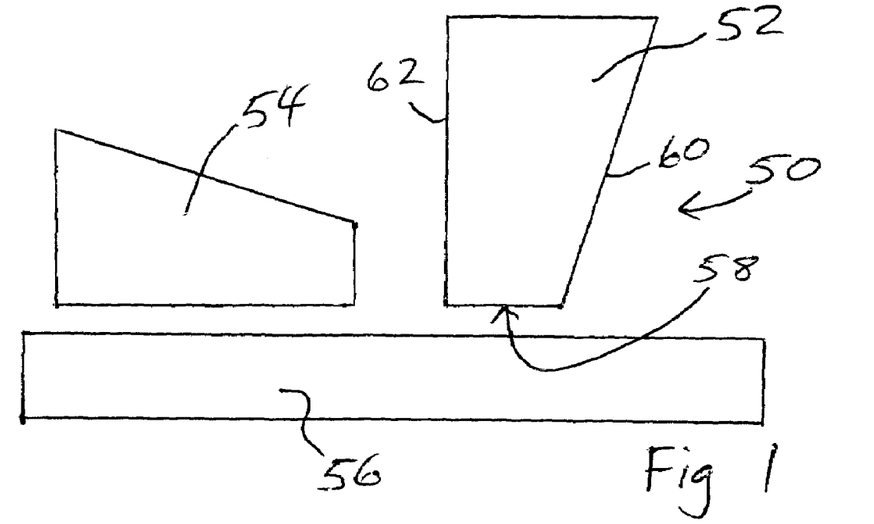
FIG. 1 is a side view of portions of a read/write head according to the present invention adjacent to a magnetic storage disk.

As shown in FIG. 1, a write head pole region 50 of a read/write head includes a portion of a write pole 52 and possibly a write shield 54. The present invention is equally applicable to shielded as well as unshielded write pole designs (e.g., monopole designs). The head 50 is positioned so that the write pole 52 and write shield 54 are adjacent to a magnetic storage disk 56 having an SUL. Typically, the disk drive system will be configured so that the magnetic storage disk 56 is moved relative to the write head 50, although it is possible for the head 50 to be moved relative to the storage disk 56. Also, most typically the storage disk 56 is moved in a direction from right to left as viewing the arrangement in FIG. 1. Thus, a specific portion of the magnetic storage disk 56 would move by the write pole 52 prior to moving by the write shield 54.

In referring to components in the head 50, it is common to refer to one side of a component as being at the leading edge or side of the component if it is on the side of the component that a particular portion of the magnetic storage disk 56 passes by prior to passing other portions of the component. Similarly, it is common to refer to a side of a component on the head 50 that is last passed by a specific portion of the storage disk 56 as the trailing edge or side of the component. Other terminology such as upstream and downstream portions and other alternatives may also be used.

As can be seen in FIG. 1, the write pole 52 has a side facing the magnetic storage disk 56 that is generally planar and parallel to the upper surface of the storage disk 56. This side of the write pole 52 is referred to as the ABS side 58. The write pole 52 also has sides generally facing in the direction of the observer when viewing FIG. 1 and on an opposite side thereof. These lateral sides are not depicted in any detail in FIG. 1. The write pole 52 also has a trailing side 62 that generally faces toward the write shield 54, is generally planar in a region near the ABS side 58, and is generally perpendicular to the ABS side 58. The write pole 52 also has a leading side 60 that is generally on an opposite face from the trailing side 62 and thus faces away from the write shield 54. In this embodiment, the leading side 60 is generally planar in the region near the ABS side and is not precisely perpendicular to the ABS side, but is closer to perpendicular to the ABS side than parallel thereto. Thus, this leading side may be said to be generally perpendicular to the direction of travel. As can be seen in FIG. 1, these characteristics cause the write pole 52 to be tapered in the region near the ABS side 58. The magnitude of this taper can be expressed as the taper angle, which is the angle between a plane perpendicular to the ABS side 58 yet parallel to the trailing side 62 and the plane formed by the leading side 60. For example, in this embodiment, the taper angle is approximately 10 degrees (although the drawing may not be exactly to scale). The taper angle may also be referred to as a leading edge bevel, which should not be confused with the side bevel inherent in a trapezoidal footprint. Although not shown in FIG. 1, the write pole 52 may have a trapezoidal footprint.

It has been discovered that write poles with non-zero taper angles provide a greater write field for a given pole thickness than do write poles with a zero taper. Further, the dependence of the amplitude of the write field on the taper angle is greater with smaller write pole thicknesses. In this discussion, the write pole thickness refers to the length of the ABS side 58 of the write pole 52 as shown in FIG. 1. In other words, it is the length of the ABS side 58 from the trailing side 62 to the leading side 60. From this discovery, it can be seen that with the use of tapered write poles it is possible to produce a given write field with a write pole of lesser thickness. Reducing the thickness of the write pole reduces the skew effect as it reduces the length of the lateral edge of the footprint at the ABS and the area of the lateral side of the write pole. Thus, it can be seen that through the use of trapezoidal-shaped write poles (in a footprint sense) that are also tapered (as viewed in FIG. 1), the skew profile can be greatly reduced.

For example, it has been found that with distances of 50 nanometers from the ABS side 58 to the SUL of the magnetic storage disk 56 and pole thicknesses in the range of 250 nanometers that a trapezoidal shaped head having a bevel of 10 degrees that is also tapered with a taper angle of 10 degrees can greatly reduce the skew profile of the head. It has been discovered that this enhanced effect to the write field continues as the taper angle is made greater. However, as the taper angle becomes greater, it may become more difficult to control the pole thickness. This difficulty arises because the amount of lapping back of the head in the manufacturing process is much more critical since the taper and the amount of lapping together determine the pole thickness. For this reason, it has been found that taper angles less than 20 degrees are preferred. More specifically, it is preferred for taper angles to be between 5 and 15 degrees. Even more specifically, it has been found that taper angles between 7 and 13 degrees may work best. As stated above, in this specific embodiment, a taper angle of 10 degrees is used. It should also be understood that only small portions of the write head 50 and of the combined read/write head are shown in FIG. 1. In particular, there is a read transducer that is not shown. Further, there are write coils that are not shown as well as the fact that only portions of the write shield 54 and write pole 52 are illustrated. Other arrangements that include having a tapered trailing or leading side on a write pole are considered to fall within the invention described herein.

Figure 2:
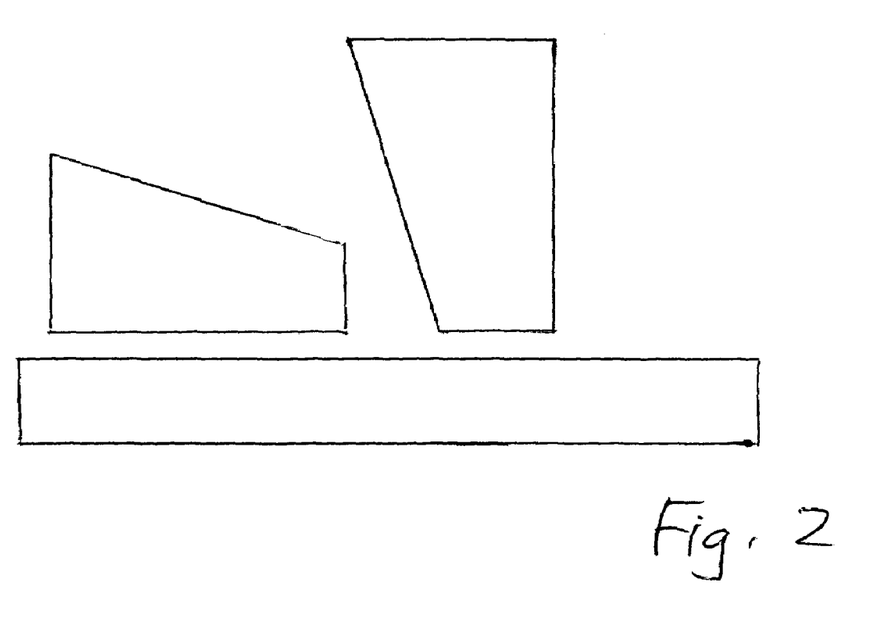
FIG. 2 is a view like FIG. 1, showing an alternative embodiment for the read/write head of the present invention.
Figure 8:
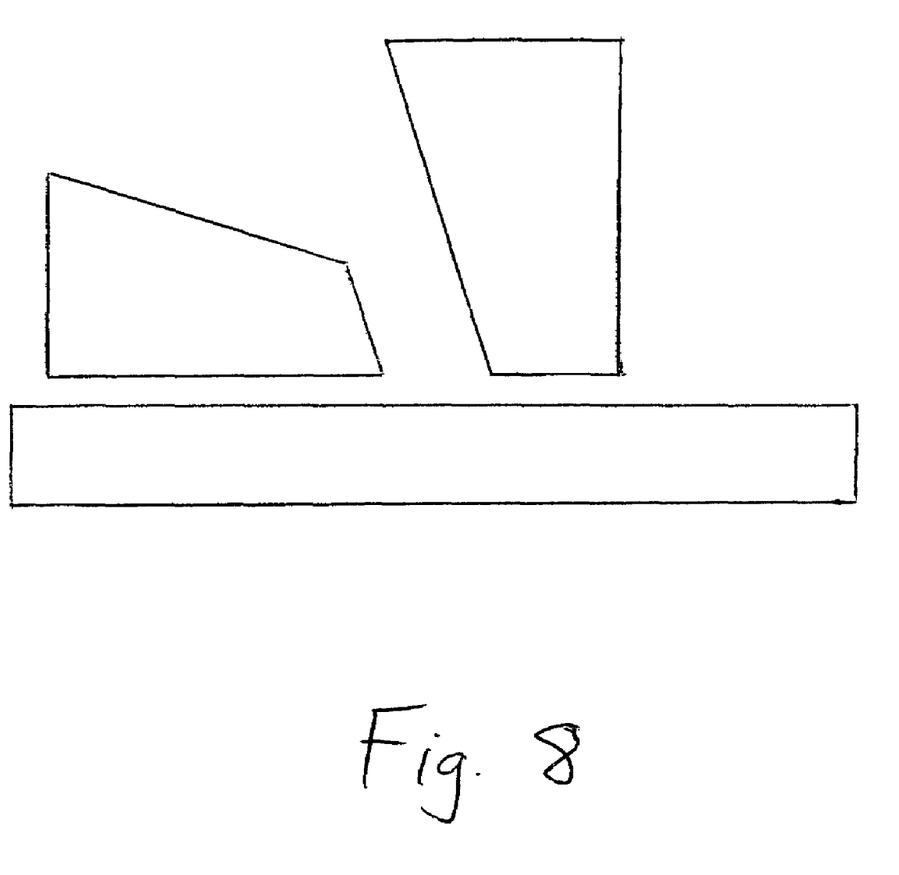
FIG. 8 is a view like FIG. 1, showing another alternative embodiment for the read/write head of the present invention.

FIG. 2 discloses a somewhat similar approach, with the primary difference being that the tapered surface of the write pole is on a trailing side, or a side facing toward the write shield (if the design includes a write shield) rather than away from the write shield. FIG. 8 shows a similar arrangement to that shown in FIG. 2, with the difference being that the side of the write shield facing toward the write pole is similarly tapered so that the two facing sides are parallel. With this arrangement, the write gap between the write pole and the write shields is constant and thus the magnitude of the effective write gap is not made a function of how precisely one can control the lapping process.

Figure 3:
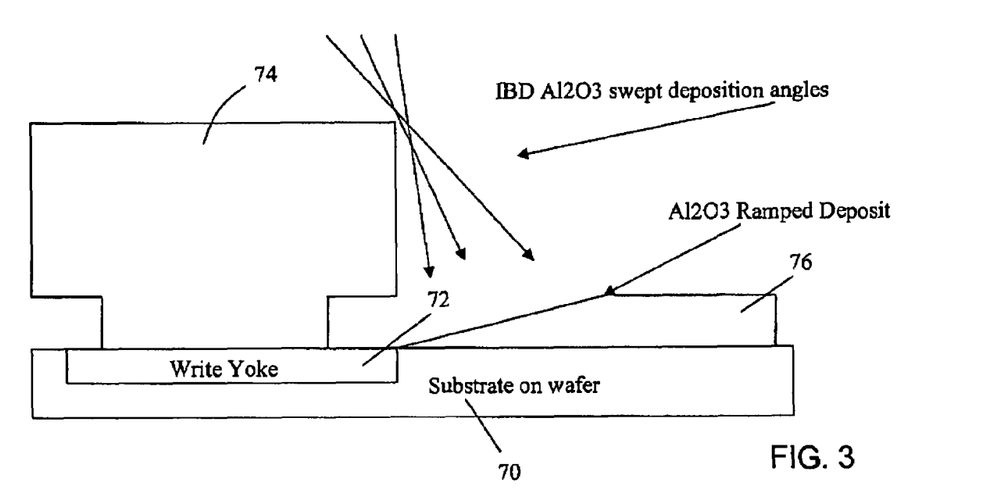
FIG. 3 is a side view of a portion of the read/write head during a manufacturing process step.
Figure 4:
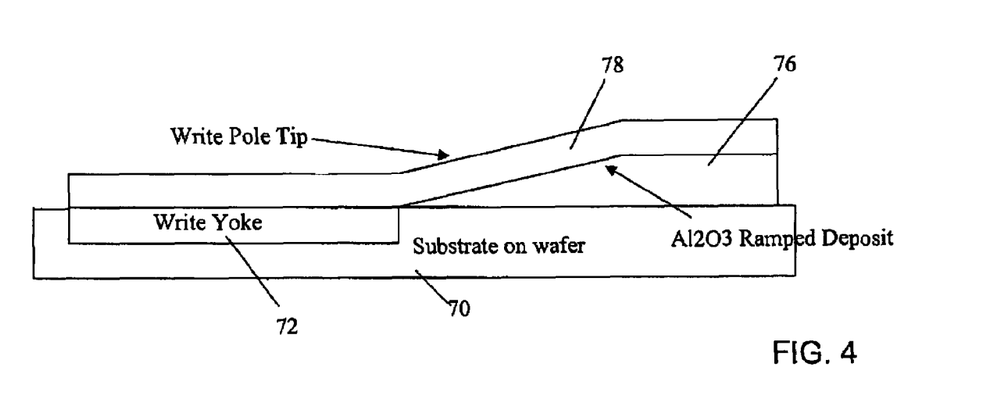
FIG. 4 is a view like FIG. 3 showing the read/write head at a later time in the manufacturing process.
Figure 5:
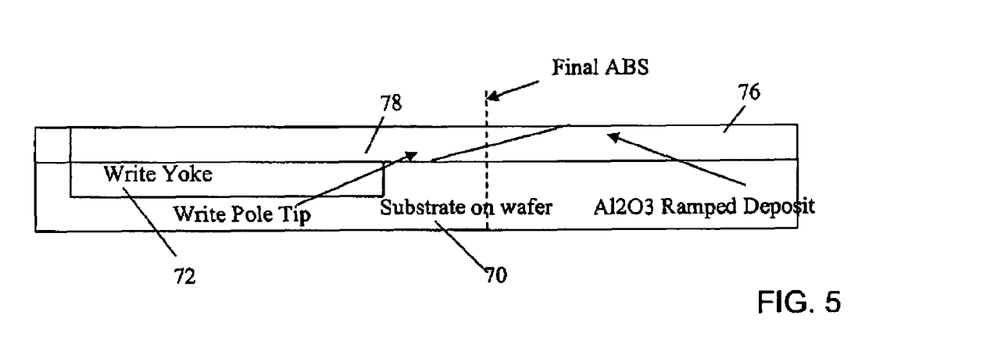
FIG. 5 is a view like FIG. 4 showing the read/write head in an even later point in the manufacturing process.

An exemplary process for manufacturing the tapered write pole 52 as part of the write head 50 is illustrated in FIGS. 3, 4, and 5. Of course, several minor and major components of the head 50 have been omitted for ease of illustration and explanation. In FIG. 5, a substrate 70 on a wafer is shown with a write yoke 72 having already been deposited thereon. The write yoke 72 has been deposited, encapsulated, and planarized with chemo-mechanical polishing (CMP). A photoresist mask 74 has been placed on top of the write yoke 72 and FIG. 3 illustrates the ion beam deposition (IBD) of aluminum oxide ($Al_2O_3$) and a swept or continuously varying deposition angle. As can be seen, this deposition process creates a ramped deposit of $Al_2O_3$ 76 on the substrate 70.

Next, the photoresist mask 74 is lifted off and a write pole tip layer 78 is deposited on top of the write yoke 72 and ramped $Al_2O_3$ deposit 76 as is shown in FIG. 4. The write pole tip layer 78 can be patterned by ion milling as necessary.

Next, the write pole tip layer 78 is encapsulated with $Al_2O_3$ and CMP is used to planarize it. This yields a structure such as is shown in FIG. 5. Lapping is then performed to the ends of a plurality of heads that are in bar form. The lapping generally removes all of the material to the right of the dashed line 84 in FIG. 5 to define the final ABS or ABS side 58. As can be appreciated, the resulting structure has a tapered side facing toward the substrate 70.

Figure 6:
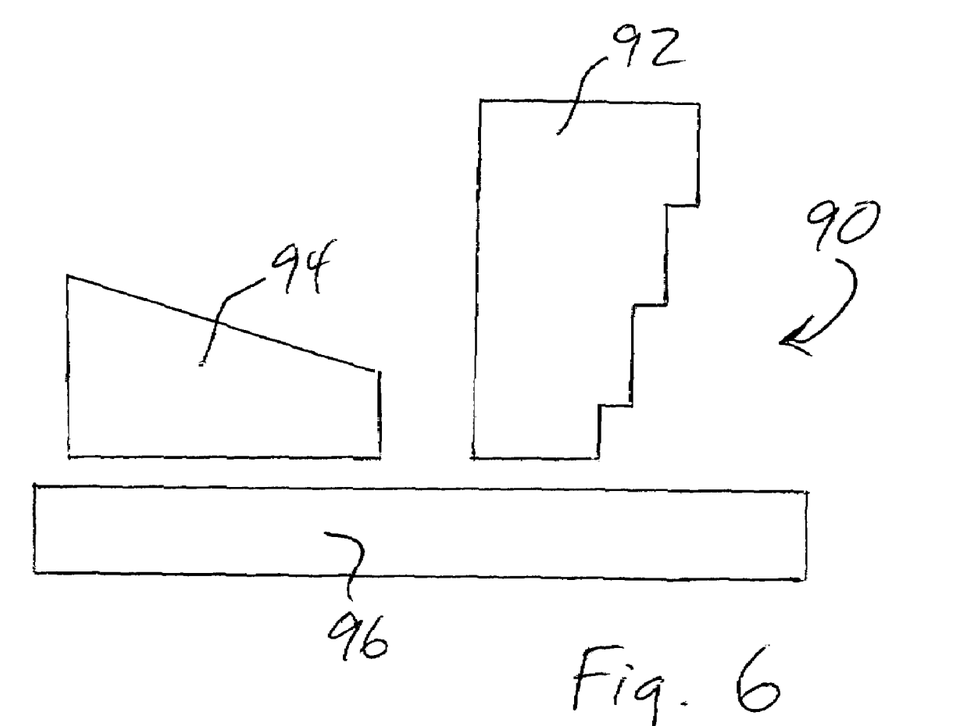
FIG. 6 is a view similar to FIG. 1 showing an alternative embodiment of a read/write head of the present invention.

An alternative process is discussed in conjunction with FIG. 6. FIG. 6 shows a write head pole region 90 (of a read/write head) having a write pole 92 and a write shield 94. The head 90 is adjacent to a magnetic storage disk 96. As can be seen, the taper in the write pole 92 is illustrated as not being exactly planar in shape. Instead, the taper is achieved by a series of process steps that produce a stepped edge that approximates a taper. The process steps could include additive steps, subtractive steps, or any other suitable methodology. One example of step heights and spacing may be step heights and widths of 20 nanometers. The steps and heights should be selected appropriate to provide the desired effective taper angle of approximately 10 degrees.

It can also be appreciated that this invention is distinguishable from a somewhat similar disclosure from Hitachi in 2000. M. Mochizuke et al., J. of Magnetism and Magnetic Materials 235, p. 194, FIG. 8 (2001). In this disclosure, a write pole is produced and then a 45 degree bevel is cut-out at the ABS. Unfortunately, it is very difficult to manufacture a write head in this manner since it is difficult to ion mill the write head at the ABS in an accurate and economical method that has minimal defects.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A read/write head for a disk drive, the head being suitable for recording data in adjacent magnetic recording media, the media including a first layer for recording data and a second layer that is a soft underlayer (SUL) to return magnetic flux to the read/write head, the head comprising:
   a read transducer; and
   a write transducer including:
      a write pole; and
      a write coil;
   wherein the write pole has a thickness on an air bearing surface (ABS) side thereof that is less than 300 nanometers from a leading edge to a trailing edge thereof; and
   wherein the write pole has a tapered surface on a side that is generally perpendicular to a direction of relative motion between the read/write head and the adjacent magnetic recording media, a magnitude of the taper being less than 15 degrees with respect to an axis that is perpendicular to said ABS side.

2. A read/write head as defined in claim 1, wherein the magnitude of the taper is more than 5 degrees.

3. A read/write head as defined in claim 1, wherein the magnitude of the taper is between 5 and 15 degrees.

4. A read/write head as defined in claim 1, wherein the magnitude of the taper is between 7 and 13 degrees.

5. A read/write head as defined in claim 1, wherein the magnitude of the taper is approximately 10 degrees.

6. A read/write head as defined in claim 1, wherein the write transducer also includes a write shield.

7. A read/write head as defined in claim 6, wherein the tapered surface is on an opposite side of the write pole from the write shield.

8. A read/write head as defined in claim 6, wherein the tapered surface is on a side of the write pole facing the write shield.

9. A read/write head as defined in claim 1, wherein the tapered surface is on a leading side of the write pole.

10. A read/write head as defined in claim 1, wherein the tapered surface is on a trailing side of the write pole.

11. A read/write head as defined in claim 1, wherein the tapered surface is generally planar.

12. A read/write head as defined in claim 1, wherein the tapered surface includes a series of cascading steps.

13. A read/write head as defined in claim 12, wherein the write pole has an ABS and the distance from the ABS to a first step is equal to or greater than the distance from the ABS to the SUL.

14. A head for recording or reading data in adjacent recording media, the head comprising
   a write pole having a tapered surface on a side that is generally perpendicular to a direction of relative motion between the head and the adjacent recording media;
   wherein the write Dole has a thickness on an air bearing surface (ABS) side thereof that is less than 300 nanometers from a leading edge to a trailing edge thereof; and
   wherein the tapered surface forms an angle with a magnitude than 15 degrees relative to a direction perpendicular to a surface of the adjacent recording media.

15. A head as defined in claim 14, wherein the magnitude of the angle relative to the direction perpendicular to the surface of the adjacent recording media is more than 5 degrees.

16. A head as defined in claim 14, further comprising a write shield arranged adjacent the write pole, wherein the tapered surface is on a side of the write pole facing the write shield.

* * * * *